May 12, 1942.  F. T. SONNE  2,282,680
GUN CAMERA
Filed July 15, 1940
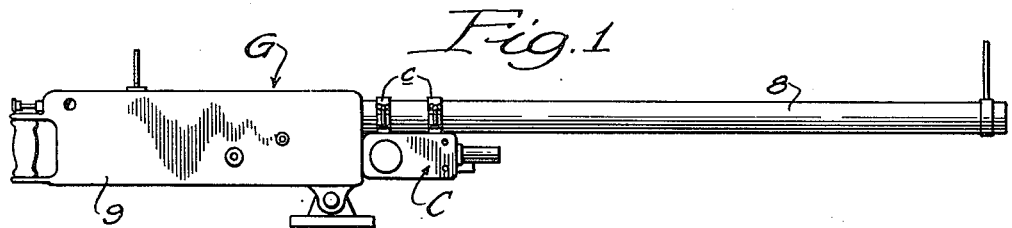
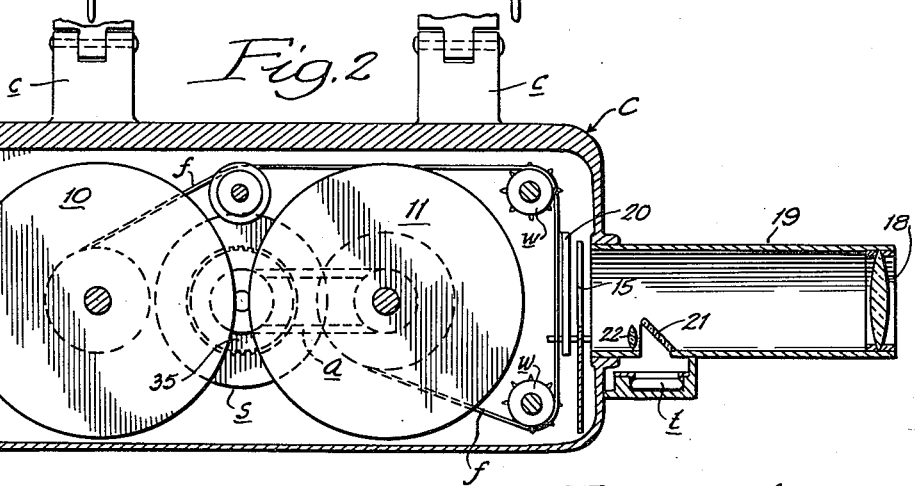
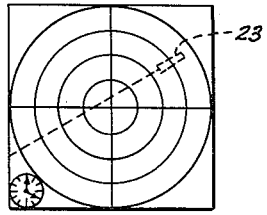
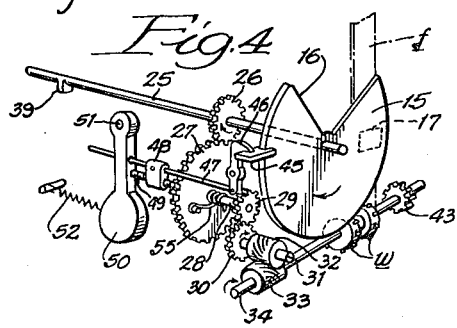

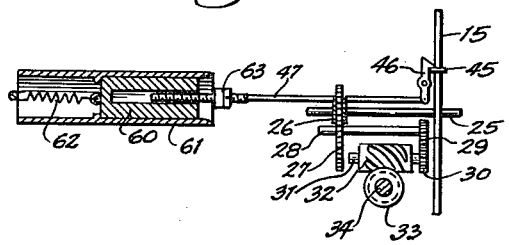
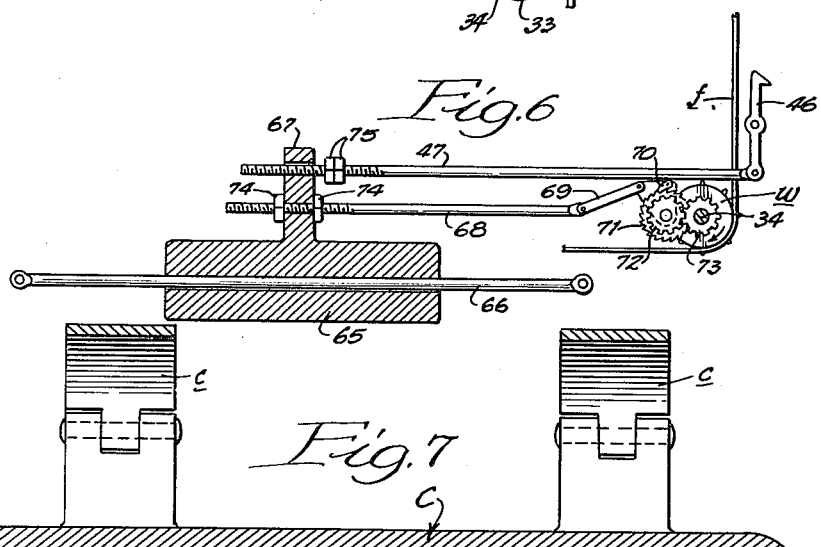
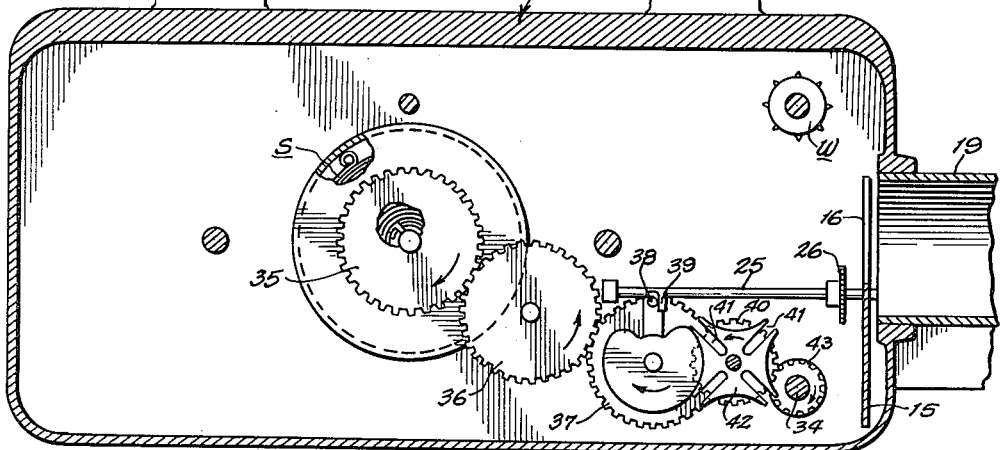

Patented May 12, 1942

2,282,680

UNITED STATES PATENT OFFICE 2,282,680

GUN CAMERA

Frederick T. Sonne, Golf, Ill., assignor to Chicago Aerial Survey Company, Chicago, Ill., a corporation of Illinois Application July 15, 1940, Serial No. 345,463

7 Claims. (Cl. 95—12)

The improvements herein described relate generally to gun cameras, and more particularly to a camera which may be affixed to a gun to photographically record its aim at the moment of discharge. The camera which is adaptable for ready mounting upon various types of guns is operable by the recoil of the gun in each case. Such a device, while useful in the development of good marksmanship, will find its greatest advantage in connection with military training.

The improvements which characterize the present camera are such as to simplify its construction, to render the camera adaptable for use with various types of firearms, both portable and fixed, to facilitate the transfer of the camera from one gun to another, and to provide an accurate means of recording the aim of the gun at the moment of discharge. In addition, I incorporate in the camera a shutter mechanism which is susceptible of adjustment as to the moment of its actuation relative to the time of gun discharge, so that the resulting photographic record can be made at various stages of the gun recoil. These and various other objects as will hereinafter appear may be realized from the gun camera of my invention, of which certain embodiments are illustrated in the accompanying drawings, in the manner following:

Figure 1 is a view in elevation of a machine gun equipped with the present camera; Fig. 2 is a vertical section, on an enlarged scale, taken longitudinally through the camera; Fig. 3 shows a suggestive photographic record wherein is illustrated a moving sleeve target in relation to reticle markings, also a time piece indicating the hour and minute of the exposure. Fig. 4 is a perspective view, slightly distorted, showing one form of mechanism whereby the camera shutter is caused to operate in response to the gun recoil; Fig. 5 is a detail in longitudinal section through a slightly modified form of one unit of the shutter operating mechanism illustrated in Fig. 4; Fig. 6, which is a generally similar view, shows one unit in a shutter operating mechanism with provision for advancing the film automatically with recoil of the gun; and Fig. 7, which is a view generally similar to Fig. 2, shows a portion of the operating mechanism by which the film advance is effected.

The gun G herein illustrated, which is of the machine type, comprises a barrel 8 and breech 9, with which is also associated a suitable firing mechanism (not shown). Mounted on the gun, conveniently upon the barrel thereof, is a camera C which, as shown, is removably, but rigidly, secured in place as by a pair of clips $c$. If desired, a seat (not shown) may be formed on the barrel to assist in locating and holding the camera in a predetermined fixed position. The camera may be transferred from one gun to another, as desired, it being unnecessary to do more than release and secure the clips in each such operation. The mounting of the camera upon the gun should be such that the axes of the gun barrel and camera lens system are in parallelism whereby substantially the exact aim of the one will be recorded in the picture which the other will produce.

Referring now to Fig. 2, the camera includes a lightproof box wherein is mounted a pair of spools 10 and 11 from one of which a film $f$ may be unwound when passing to the other upon which it is adapted to be rewound. A motor, such as a spring $s$, through any appropriate transmission $a$ may be used to rotate the rewinding spool whereby to cause an advance of the film which is trained over sprocket wheels $w$ so as to pass before a shutter 15, here shown as a disk (see Fig. 4) with a segmental opening 16 which, during each rotation of the shutter, is momentarily in register with an opening 17 through which the sensitized film is exposed, to record latently the view that is exhibited within the field of the camera lens system which may include an objective 18 at the outer end of the tube 19 which is projected forwardly from the camera. A reticle 20 is desirably interposed in the lens system so that in the developed picture (see Fig. 3) cross lines, circles, or any other preferred markings will appear to assist in determining the amount of error in the gun aim at the moment of discharge. A chronometer $t$, conveniently a small watch, may be fitted into a housing at one side of the tube so that with the aid of a mirror 21 and lens 22 the time of day at which each exposure is made will be recorded in the picture. If, at the time of exposure, the gun be aimed at a moving target, as 23, that object will also appear in the developed picture against the reticle lines, thereby facilitating a quick reading of the extent of error in the gun aim at the instant of firing.

The present invention is concerned largely with the mechanism by which the camera shutter is operated to record the aim of the gunner at the moment of firing. This mechanism, which operates with entire independence of the trigger or other firing device with which the gun is equipped, is actuated by the kick-back of the gun itself whenever it is discharged in the usual way. Several forms of such mechanism, each suitable to fulfill the requirements of this invention, are herein illustrated and will now be described.

The disk shutter 15 shown in Fig. 4 is carried upon a shaft 25 whereon is also mounted a pinion 26 in mesh with a gear 27 loosely mounted upon a shaft 28. A pinion 29 upon this latter shaft meshes with a second pinion 30 upon a stub shaft 31 whereon is mounted a helical gear 32 in mesh with another helical gear 33 upon a cross-shaft 34. This latter shaft serves as a mounting for one of the sprocket wheels w, the arrangement being such that when the shaft 34 is rotated the associated wheel w will also rotate to produce a feed of the film f. The constant force exerted by the spring s (see Fig. 7) tends to rotate a gear 35 in mesh with a second gear 36 which in turn is in mesh with a third gear 37 from which extends a pin 38 that is normally rested against a lug 39 on the shaft 25 whereby motion of all three gears is arrested. The pin 38 is spaced from the axis of the gear 37 and from a gear 40 in mesh therewith a distance which will assure entry of the pin successively within radial slots 41 in a star wheel 42 that is mounted coaxially with the gear 40. This latter gear is in mesh with a pinion 43 mounted on the cross-shaft 34.

A lug 45 is provided adjacent the periphery of the shutter in position to be engaged by a pivoted latch 46 which normally restrains rotation of the shutter. This latch is in connection with a rod 47 extending away therefrom and carrying a block 48 wherein is accommodated an adjustable impact screw 49 traversing the block, one end of the screw projecting outwardly therefrom to receive engagement from a pendulum 50 which is pivotally suspended at 51. With each oscillatory stroke in one direction, the pendulum is adapted to strike the impact screw at a definite point in its movement, a spring 52 in connection with the pendulum tending normally to sustain the pendulum in a non-engaging position.

In operation, discharge of the gun will produce a recoil comprising two strokes, viz. the kickback and recovery movements. On the kickback relative movement will take place between the pendulum and the remaining mechanism within the camera, with the result that the latch is operated to release the shutter. The force of the spring motor which is transmitted to the gear 27 thereupon releases stored-up energy in a spring 55 constituting a driving connection between this gear and the shaft 28, whereby to produce a quick rotation of the shutter with a consequent exposure of the film to produce a latent record which will indicate the aim of the gun at the moment of its discharge. During rotation of the shutter the lug 39 moves out of the way of the pin 38 to permit the force of the spring motor to produce a measured rotation of the cross-shaft 34 with a consequent advance of the film for a distance of one frame.

The shutter operating mechanism just described is merely one of several that may be employed for the purpose. It embodies my inventive principle of main importance, viz., a shutter operating means which is operated or actuated by recoil of the gun, thereby dispensing with any connections to the firing mechanism thereof. For this reason the camera is readily attachable to or transferable from the gun and, in consequence, has greater adaptability for use in different places and with actual service guns of various types.

Referring now to Fig 5, in place of the pendulum there is illustrated a weight 60 which is freely slidable along a guide 61. The weight and guide are indicated as having the forms, respectively, of a plunger and cylinder wherein the weight is normally maintained away from its acting position by a spring 62. Upon each stroke of the plunger in a direction counter to the spring, one of a pair of impact lock nuts 63, adjustable along the rod 47, is subjected to a percussive force in the same manner as is the impact screw when hit by the pendulum of Fig. 4.

In Fig. 6 the weight 65 which is slidable upon a guide rod 66, is provided with a lateral extension 67 having therethrough two passages through which are extended, respectively, the rod 47 and a second rod 68 which, through a link 69, is in connection with a pawl 70 adapted to coact with a ratchet wheel 71 which is coaxial with a pinion 72 in mesh with a second pinion 73 upon the shaft 34. The rod 68 is adjustably secured, as by lock nuts 74 which are in screw-threaded relation therewith, to the extension 67 whereby, with each stroke of the weight 65, the ratchet wheel will be rotated a predetermined distance, through the agency of the pawl 70, to rotate the pinion 73 and feed the film forward a corresponding distance. A pair of lock nuts 75 which are screw-threaded on the rod 47 form an adjustable impact member against which the extension 67 is adapted to deliver a blow with each stroke, in one direction, of the weight upon its guide rod, the pivoted latch being rocked with each such operation.

The present camera is adaptable for use with guns of almost every type, if not all, ranging from light fire arms to heavy guns of every description. The shutter mechanism will operate regardless of the position of the gun. The sliding plunger type, illustrated in Figs. 5 and 6 is particularly suitable with anti-aircraft guns whose barrels may be aimed upwardly at a high angle, and also with aeroplane guns which are fired in almost every conceivable position. In all such cases, the kick-back, consequent upon discharge of the gun, will produce a relative movement between the pendulum or weight and the remaining shutter mechanism, sufficient to actuate the shutter operating mechanism with a consequent exposure of the film at substantially the moment of gun discharge. By adjusting the position of the impact screw, (Fig. 4) or of the impact nuts (Figs. 5 and 6), this actuation of the shutter mechanism may be advanced or delayed slightly relative to the moment of gun discharge, so that it is possible to change, to some extent at least, the timing of the photograph in each case.

In practice the photographs to be produced by the camera of my invention, will afford an accurate record of the aim of the gunner. As the result of the record thus obtained, the gunner will be given information of value by which to correct errors which may persistently appear in his markmanship. An improvement in the quality of gunnery may thus be expected to follow a study of photographs which show the kind and extent of errors in aim.

I claim:

1. In combination, a gun and a camera fixedly interconnected exteriorly of the gun with the barrel of the gun in parallelism with the lens system of the camera, a light-sensitized medium within the camera, a shutter adapted, when opened, to expose the medium for the recording of a latent photograph thereon, and mechanism for operating the shutter in connection therewith comprising two interacting units movably mounted within the camera and movable relative to each other, one of the units being in operative connection with the shutter and the other being a weight free to move in a fixed path lengthwise of the gun barrel and adapted to set the first named unit in motion in response to recoil consequent upon discharge of the gun.

2. In combination, a gun and a camera fixedly interconnected exteriorly of the gun with the barrel of the gun in parallelism with the lens system of the camera, a light-sensitized film, a mounting whereon the film is adapted to be advanced within the camera, a shutter adapted, when opened, to expose the film for the recording of a latent photograph thereon, and mechanism in connection with both the shutter and film mounting for operation thereof comprising two interacting units movably mounted within the camera and movable relative to each other, one of the units being in operative connection with the shutter and the other being a weight free to move in a fixed path lengthwise of the gun barrel and adapted to set the first named unit in motion in response to recoil consequent upon discharge of the gun.

3. In combination, a gun and a camera fixedly interconnected exteriorly of the gun with the barrel of the gun in parallelism with the lens system of the camera, a light-sensitized medium within the camera, a shutter adapted, when opened, to expose the medium for the recording of a latent photograph thereon, and mechanism for operating the shutter in connection therewith comprising two interacting units movably mounted within the camera and movable relative to each other, one of the units being in operative connection with the shutter and the other being a weight free to move in a fixed path lengthwise of the gun barrel and adapted to set the first named unit in motion in response to recoil consequent upon discharge of the gun.

4. In combination, a gun and a camera fixedly interconnected exteriorly of the gun with the barrel of the gun in parallelism with the lens system of the camera, a light-sensitized medium within the camera, a shutter adapted, when opened, to expose the medium for the recording of a latent photograph thereon, and mechanism for operating the shutter comprising two interacting units movably mounted within the camera and movable relative to each other, one of the units being in operative connection with the shutter and the other being a weight free to move in a fixed path lengthwise of the gun barrel and adapted to set the first named unit in motion in response to recoil consequent upon discharge of the gun.

5. In combination, a gun and a camera fixedly interconnected exteriorly of the gun with the barrel of the gun in parallelism with the lens system of the camera, a light-sensitized film, a mounting whereon the film is adapted to be advanced within the camera, a shutter adapted, when opened, to expose the film for the recording of a latent photograph thereon, and mechanism in connection with both the shutter and film mounting for operation thereof comprising two interacting units movably mounted within the camera, one of the units incorporating means for advancing the film a measured distance with each operation thereof, the two units being adapted for relative motion, and the second unit being movable in response to recoil consequent upon discharge of the gun and in connection with the first unit adapted therethrough, to operate the shutter and advance the film.

6. In combination, a gun and a camera fixedly interconnected exteriorly of the gun with the barrel of the gun in parallelism with the lens system of the camera, a light-sensitized medium within the camera, a shutter adapted, when opened, to expose the medium for the recording of a latent photograph thereon, mechanism for operating the shutter in connection therewith comprising two interacting units movably mounted within the camera adapted one to set the other in motion in response to recoil consequent upon discharge of the gun, and means comprised within one of the two units for advancing or delaying the moment of interaction therebetween in relation to the gun recoil whereby to adjust the moment of exposure relative to discharge of the gun.

7. In combination, a gun and a camera fixedly interconnected exteriorly of the gun with the barrel of the gun in parallelism with the lens system of the camera, a light-sensitized medium within the camera, a shutter adapted, when opened, to expose the medium for the recording of a latent photograph thereon, mechanism for operating the shutter in connection therewith comprising two interacting units movably mounted within the camera adapted one to set the other in motion, and means mounting the one of the unit in a manner to interact with the other unit in response to the recoil kick-back stroke consequent upon discharge of the gun.

FREDERICK T. SONNE.